United States Patent
Mercer

[11] 4,017,242
[45] Apr. 12, 1977

[54] INJECTION MOLDING APPARATUS

[75] Inventor: James R. Mercer, Akron, Ohio

[73] Assignee: The McDowell-Wellman Engineering Company, Cleveland, Ohio

[22] Filed: Oct. 28, 1975

[21] Appl. No.: 626,303

[52] U.S. Cl. .............................................. 425/243
[51] Int. Cl.² .......................................... B29F 1/00
[58] Field of Search ............. 425/243, 242 R, 247

[56] References Cited
UNITED STATES PATENTS

| | | | |
|---|---|---|---|
| 2,871,517 | 2/1959 | Allard | 425/243 X |
| 2,878,515 | 3/1959 | Strauss | 425/243 |
| 3,533,594 | 10/1970 | Segmuller | 425/243 X |
| 3,763,293 | 10/1973 | Nussbaum | 425/243 X |
| 3,876,356 | 4/1975 | Fazekas et al. | 425/243 X |

Primary Examiner—Richard B. Lazarus
Attorney, Agent, or Firm—McNenny, Pearne, Gordon, Gail, Dickinson & Schiller

[57] ABSTRACT

A thermosetting injection molding machine includes an injector chamber, a distribution platen, four distribution nozzles, and a mold heating platen. A thermosetting material flows from the injector chamber to two crossed distribution chambers each of which extends from edge to edge completely through the distribution platen. Liquid coolant passages extend through the distribution platen along both sides of each of the distribution chambers. The distribution nozzles include cores which block the ends of the distribution chambers and which carry the thermosetting material through the mold heating platen to the mold. The distribution nozzles also include jackets having a greater coefficient of heat conductivity than the cores for maintaining all but the tip of the cores adjacent the mold at a temperature below the curing temperature of the thermosetting material. A removable mold for the machine includes a mold cluster adjacent each of the four distribution nozzles. The mold clusters each include a plurality of mold cavities and a runner for carrying the thermosetting material from its associated distribution nozzle to its associated mold cavities. By this arrangement, a multiple nozzle distribution system and a mold heating system are provided by the machine completely independently of the mold to simplify mold design.

23 Claims, 4 Drawing Figures

INJECTION MOLDING APPARATUS

BACKGROUND AND SUMMARY OF THE INVENTION

This invention relates to thermosetting injection molding machines for injection molding a natural or synthetic material that is cured by heating the material to a predetermined temperature. One problem which is encountered in the use of such machines is the relatively large amount of scrap material which may result from their use. When a large number of parts are to be produced with each cycle of the machine, the thermosetting material is pushed from an injector chamber under pressure to a mold which has interconnecting runners to distribute the thermosetting material from the injector chamber to each of the mold cavities. All of the thermosetting material which remains in the mold runners during curing is cured along with the material in the mold cavities. This material in the runners must then be scrapped as waste material.

The problem of wastage in thermosetting molding machines is not unknown. U.S. Pat. No. 3,661,487 relates to the problem of reducing the waste which is produced by thermosetting injection molding machines. U.S. Pat. No. 3,876,356 relates to the problem of reducing waste in thermosetting transfer molding machines.

Other prior art patents include U.S. Pat. No. 3,797,984, which relates to a single liquid cooled nozzle machine in which a sprue is formed in the tip of the nozzle. Prior art patents which disclose various distribution arrangements for thermo-plastic injection molding machines are shown in U.S. Pat. Nos. 2,871,517, 2,878,515 and 3,533,594.

The present invention departs from these and other machines by providing a thermosetting injection molding machine in which a large quantity of articles is produced with each cycle of the machine while the waste material is minimized. The machine includes a cold injector chamber, a cold distribution platen, an array of distribution nozzles having a zone of high temperature gradient from cold to hot, and a mold heating platen. The mold used in the machine has a plurality of hot mold cavities and a hot runner for each distribution nozzle. As used herein, the word "hot" refers to a temperature sufficient to substantially cure the thermosetting material within the machine cure cycle time. The word "cold" refers to a temperature below that required to substantially cure the thermosetting material during the allotted time, yet high enough that the thermosetting material flows properly and can be molded.

The invention further provides at least one straight distribution chamber extending laterally from edge to edge completely through the distribution platen, and a distribution nozzle blocking each end of the distribution chamber. Each distribution nozzle includes a core having a passage extending from the distribution chamber through the heating platen to its associated mold cluster. Each distribution nozzle also includes a jacket having a higher coefficient of thermal conductivity than the core surrounding the core and extending through the mold heating platen in spaced relation thereto and terminating at a location spaced from the end of the core passage. A bushing located at the tip of the core provides a seal between the heating platen and the tip of the core and maintains the thermosetting material in the tip of the core passage at a temperature of at least the curing temperature of the material. A short longitudinal space between the bushing and the jacket produes a zone of high temperature gradient so that the remaining portions of the passage in the core of the nozzle can be maintained at a temperature below the curing temperature of the thermosetting material. A system of cooling passages in the distribution platen maintains the temperature of a thermosetting material in the distribution platen below the curing temperature of the thermosetting material, and the heating platen maintains the temperature of the thermosetting material in each mold cluster at a temperature of at least the curing temperature of the material.

In this manner, a multiple nozzle distribution system and a mold heating system are provided by the thermosetting injection molding machine completely independently of the mold to simplify mold design. Additionally, the thermosetting material is delivered to an aray of several individual mold clusters by a distribution system which produces substantially no waste because all of the distribution system except the tip of the distribution nozzles is maintained at a temperature below the curing temperature of the thermosetting material. Still further, the hot runner of each mold cluster which conveys the thermosetting material from the distribution nozzle to the several mold cavities of the mold cluster is relatively short, since the runner need only connect the distribution nozzle with mold cavities which are close to one another and the runner need not connect all of the mold cavities of the mold. This minimizes the volume of thermosetting material in the hot runners of the mold and minimizes the waste produced in such runners when the material in the runners is cured.

BRIEF DESCRIPTION OF THE DRAWINGS

These and other aspects and advantages of the invention will be apparent to those skilled in the art upon an understanding of the preferred embodiment of the invention shown in the accompanying drawings, wherein.

DETAILED DESCRIPTION OF THE DRAWINGS

Figure 1:
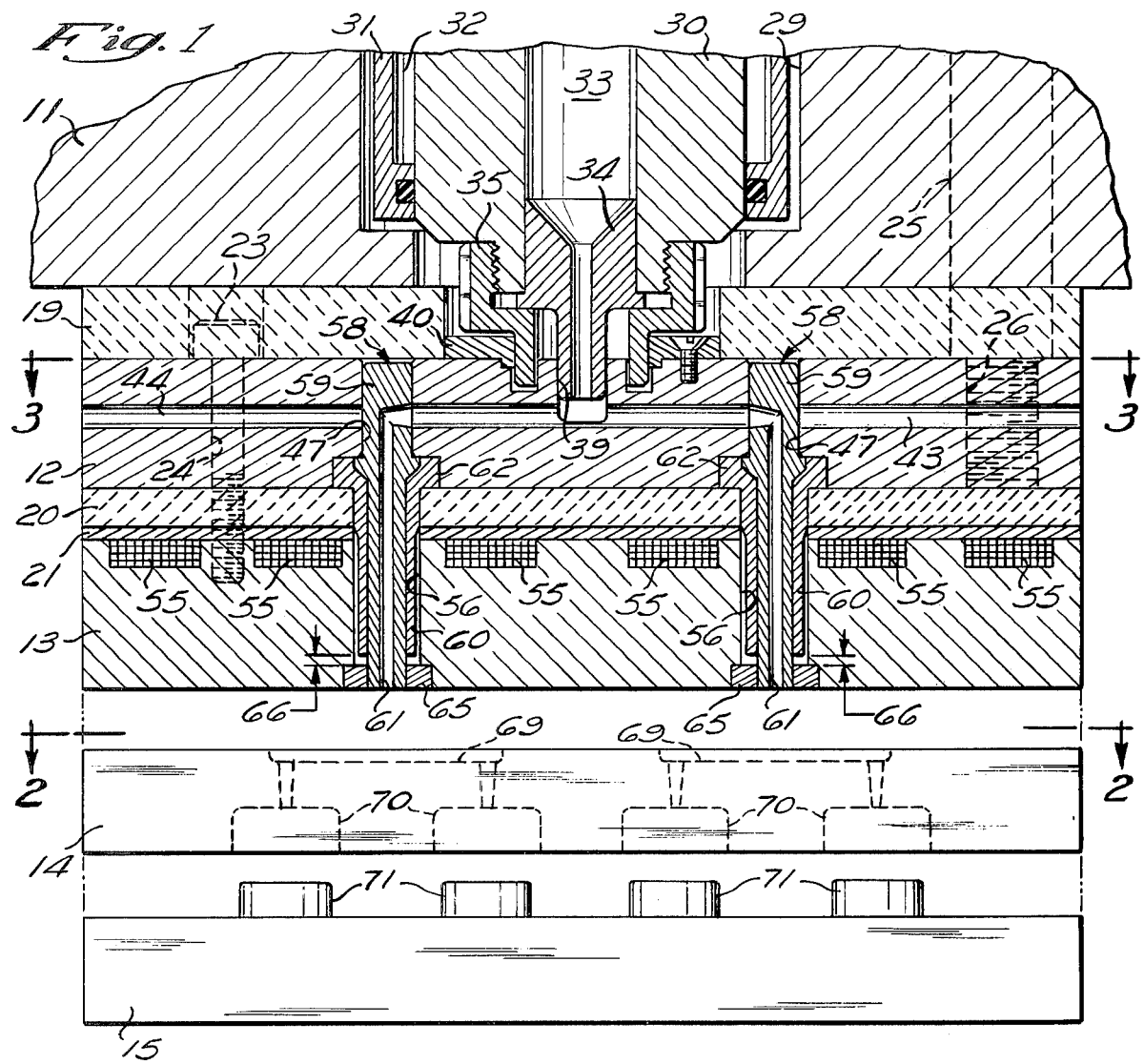
FIG. 1 is a cross-sectional view of a thermosetting injection molding machine and a mold according to the principles of the invention with portions of the machine and the mold shown in an open position.

Referring now to the drawings in greater detail, FIG. 1 shows a thermosetting injection molding machine having a mold press bolster platen 11, a distribution platen 12, and a mold heating platen 13. Mold halves 14 and 15, which are removably mounted in the injection molding machine, are also shown in FIG. 1. These elements may be arranged in a press of the type shown in U.S. Letters Pat. No. 3,656,406, the specification of which is incorporated herein by reference, and may be provided with an injector piston of the type shown in U.S. Letters Pat. No. 3,788,522, the specification of which is also incorporated herein by reference.

A first load bearing heat insulation plate 19 is interposed between the bolster platen 11 and the distribution platen 12. A second load bearing heat insulation plate 20 and a back-up plate 21 are interposed between the distribution platen 12 and the mold heating platen 13. The heat insulation plates 19 and 20 are each flat plates of substantially square lateral cross-sectional configuration made of a suitable insulation material. The back-up plate 21 is also of square lateral cross-sectional configuration and is of a suitable steel.

Four bolts 23, one of which is shown in phantom in FIG. 1, extend through four drilled holes 24 in the distribution platen 12 (see also FIG. 3) and through aligned holes in the heat insulation platen 20 and back-up plate 21 for threaded fastening to the mold heating platen 13. Two threaded rods 25, only one of which may be seen in phantom in FIG. 1, are threaded into two threaded holes 26 (see also FIG. 3) in the distribution platen 12 for securing the distribution platen 12 to the bolster platen 11. In this manner, the distribution platen 12, mold heating platen 13, insulation plate 20 and back-up plate 21 are secured together as a subassembly by the bolts 23, and the subassembly is removably secured to the bolster platen 11 by the threaded rods 25.

The bolster platen 11 includes a longitudinally extending opening 29 which receives a cylindrical injector barrel 30. A cylindrical jacket 31 surrounds the injector barrel 30 and defines a temperature controlling chamber 32 in which a liquid is circulated for temperature controlling purposes. A cylindrical injector chamber 33 extends longitudinally through the injector barrel 30, and a supply nozzle 34 is secured at the end of the injector chamber 33 by a nozzle retaining nut 35 which is threaded on the end of the injector barrel 30.

As shown in FIG. 1, the distribution platen 12 includes a cylindrical supply chamber 39 extending longitudinally from the side of the distribution platen 12 which faces the bolster platen 11. The nozzle 34 extends into the supply chamber 39, and a suitable fit is provided between the outer periphery of the nozzle 34 and the wall of the supply chamber 39 to form a primary peripheral seal therebetween. An annular guide and sealing bushing 40 is threadably secured to the distribution platen 12 by a plurality of circumferentially spaced flat head screws, one of which is shown in FIG. 1. The bushing 40 guides the nozzle 34 into the supply chamber 39 during assembly, and a secondary peripheral seal is formed between the radially facing confronting cylindrical surfaces of the bushing 40 and retaining nut 35 to prevent the passage of any thermosetting material that might leak past the primary peripheral seal.

Figure 3:
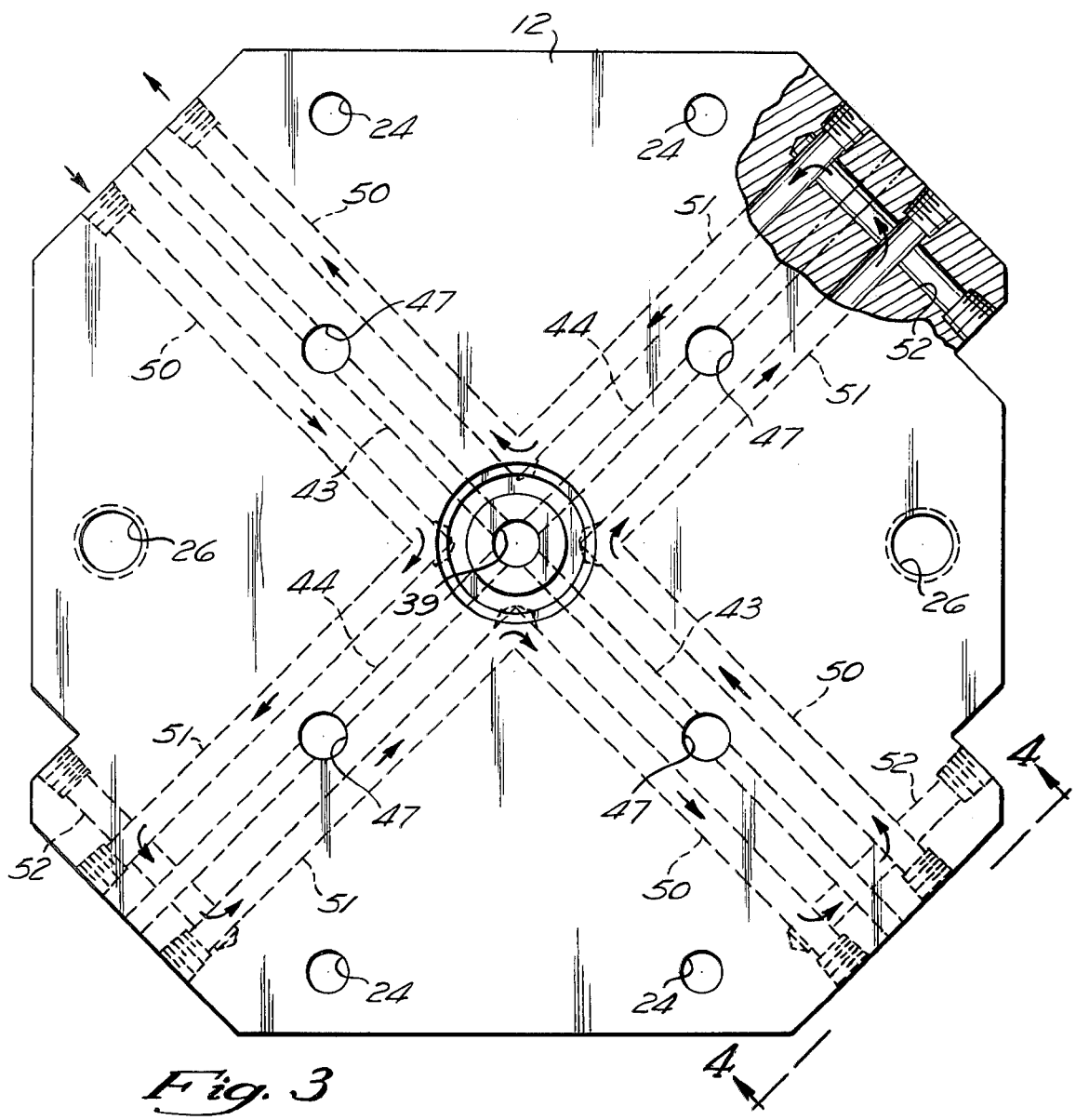
FIG. 3 is a top plan view of the distribution platen of the machine shown in FIG. 1 taken along reference view line 3—3 of FIG. 1.
Figure 4:
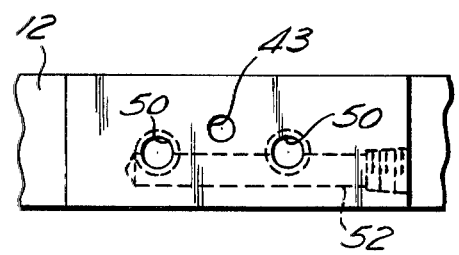
FIG. 4 is a fragmentary side elevational view of the distribution platen taken along reference view line 4—4 of FIG. 3.

Referring now to FIGS. 1, 3 and 4, the distribution platen 12 also includes first and second distribution chambers 43 and 44. Each of the distribution chambers extends in a straight line solely in a lateral direction from edge to edge completely through the distribution platen 12, and each of the laterally extending distribution chambers 43 and 44 intersects the longitudinally extending supply chamber 39. The distribution chambers 43 and 44 are coplanar and are perpendicular to one another.

As shown in FIGS. 1 and 3, the distribution platen 12 also includes four nozzle bores 47 extending from the side of the distribution platen 12 which faces the mold halves 14 and 15 in a longitudinal direction. Each of the nozzle bores 47 intersects one of the distribution chambers 43 and 44 at a location between the supply chamber 39 and the peripheral edge of the distribution platen 12 from which the distribution chamber extends. Each of the nozzle bores 47 includes a larger diameter portion adjacent the side of the distribution platen 12 which faces the mold halves 14 and 15, a smaller diameter portion extending to the other side of the distribution platen 12, and an annular shoulder formed at the juncture of the larger and smaller diameter portions.

As best shown in FIGS. 3 and 4, the distribution platen 12 also includes a liquid temperature controlling passage arrangement which extends parallel to the distribution chambers 43 and 44. The passage arrangement includes drilled passages 50 extending laterally from the outer peripheral edges of the distribution platen 12 from which the first distribution chamber 43 extends in a direction toward the supply chamber 39. The passages 50 each intersect a passage 51 extending laterally from the outer peripheral edge of the distribution platen 12 from which the second distribution chamber 44 extends laterally in a direction toward the supply chamber 39. The passges 50 and 51 are coplanar and have a center line which is disposed below the center line of the distribution chamber along which they extend. This places the passages 50 and 51 between the mold heating platen 13 and the distribution chambers 43 and 44 so that the passages 50 and 51 provide a controlled temperature thermal barrier between the distribution passages 43 and 44 and the mold heating platen 13.

A plurality of cross drilled connecting passages 52 connect parallel ones of the passages 50 and 51 at a location between the peripheral edge of the distribution platen from which the distribution chambers extend and the nozzle bores 47 which intersect the distribution chambers. As shown in FIG. 4, the connecting bores 52 are coplanar and are disposed in a plane located beneath the distribution chambers 43 and 44, thereby permitting the passages 50 and 51 to be located close to the chambers 43 and 44.

Each of the open ends of the passages 50, 51 and 52 is closed with a threaded plug, with the exception of the open ends of the passages 50 shown in FIG. 3 which are not connected by a connecting passage and which provide an inlet and an outlet for the passage arrangement. In this manner, the passage arrangement is characterized by four V-shaped passages each having a vertex adjacent the supply chamber 39 and having legs extending parallel to the distribution chambers 43 and 44, with adjacent ones of the legs connected to form a continuous flow path which provides even cooling of both of the distribution passages 43 and 44. Any suitable liquid, such as water, may be circulated through the passages 50, 51 and 52 to maintain the temperature of the thermosetting material in the distribution chambers 43 and 44 at a temperature below the curing temperature of the material as further explained below.

Referring again to FIG. 1, the mold heating platen 13 is a generally flat plate having a square lateral cross-sectional configuration. The mold heating platen 13 is provided with a plurality of coplanar spaced apart parallel slots extending from one peripheral edge to the other of the platen 13. The slots each carry an electrical resistance heating unit 55 for heating the platen 13 and the mold halves 14 and 15. A lower mold heating platen, not shown in the drawings, is also provided on the other side of the mold halves 14 and 15 so that the mold halves 14 and 15 are sandwiched between two mold heating platens. The heating units 55 are controlled by temperature sensing thermocouples or by other appropriate devices to provide the electrical energy to the heating units 55 which is required to obtain the desired heating. The mold heating platen 13 is also provided with four nozzle bores 56 (only two of which are shown in FIG. 1). The four nozzle bores 56 of the heating platen 13 are aligned with the four nozzle bores 47 of the distribution platen 12. Each of the nozzle bores 56 includes an enlarged diameter portion adjacent the mold half 14 and a smaller diameter portion extending the remainder of the way through the heating platen 13.

Four identical distribution nozzles 58, two of which are shown in FIG. 1, extend through the four aligned sets of nozzle bores 47, 56. Each distribution nozzle 58 includes a cylindrical core 59 and a cylindrical jacket 60.

Each core 59 extends longitudinally through its associated nozzle bores 47 and 56 from its associated distribution chamber 43 or 44 to the side of the heating platen 13 which faces the mold halves 14 and 15. The cores 59 completely block the distribution passages 43 and 44 to prevent escape of the thermosetting material. The cores 59 each include a longitudinally extending passage 61 extending from its associated distribution chamber 43 or 44 to the tip of the core 59 adjacent the mold halves 14 and 15. A short laterally extending passage in each core 59 aligned with the associated distribution chamber 43 or 44 provides a flow passage for the thermosetting material from the distribution chamber 43 or 44 to the longitudinally extending passage 61 in the core 59. The core 59 of the distribution nozzle 58 is made of a material having a low coefficient of heat conductivity relative to the material of the jacket 60, and in the preferred embodiment the core 59 is stainless steel having a coefficient of thermal conductivity of less than 20 b.t.u./hr./ sq.ft./F.°/ft.

Referring still to FIG. 1, the jacket 60 is generally cylindrical and includes an interior peripheral surface which engages an exterior peripheral surface of the core 59. The entire outer peripheral cylindrical surface of the jacket 60 is spaced radially inwardly from the nozzle bore 56 of the mold heating platen 13 by an annular air gap to prevent heat transfer from the mold heating platen 13 to the jacket 60 by conduction between engaging metal surfaces.

The end of each jacket 60 is provided with a heat portion 62 of larger diameter than the portion of the jacket 60 which extends through the mold heating platen 13. This provides a greater area of contact between the jacket 60 and the distribution platen 12 to transfer heat from the jacket 60 to the distribution platen 12 to prevent the temperature of the thermosetting material in the portion of the longitudinal passage 61 surrounded by the jacket 60 from reaching the curing temperature of the material. The liquid passages 50 and 51 are interposed between the distribution passages 43 or 44 and the enlarged diameter head portion 62 of each jacket 60 so that the heat from the enlarged diameter head portions 62 is transferred to the cooling liquid in the passages 50 and 51 and does not heat the thermosetting material in the distribution chambers 43 and 44 to its curing temperature.

The jacket 60 is of a material which has a coefficient of thermal conductivity which is significantly greater than the coefficient of thermal conductivity of the core 59 by a sufficient amount that heat from the mold heating platen 13 is carried upwardly along the jacket 60 to the mold distribution plate 12 at a fast enough rate to prevent the temperature in the portion of the longitudinal passage 61 surrounded by the jacket 60 from reaching the curing temperature of the thermosetting material. In the preferred embodiment, the jacket 60 is of copper having a coefficient of thermal conductivity of at least 200 b.t.u./hr./sq.ft./F°/ft. Additionally, to reduce heat transfer from the mold heating platen 13 to the jacket 60 by radiation, the entire exterior peripheral surface of the jacket 60 which extends through the nozzle bore 56 is chrome plated to provide a heat reflective surface.

As further seen in FIG. 1, the cylindrical jacket 60 does not extend with the core 59 the entire distance from the distribution platen 12 to the mold halves 14 and 15. Instead, the jacket 60 is spaced from the free end of the core 59 adjacent the mold halves 14 and 15 by a predetermined distance, which, in the preferred embodiment, is approximately three eights (3/8) inch.

A seal bushing 65 is disposed on the free end of the core 59 adjacent the mold halves 14 and 15. The seal bushing 65 provides a seal between the outer peripheral surface of the core 59 and the inner peripheral surface of the nozzle bore 56 to prevent leakage of the thermosetting material therebetween. The seal bushing 65 is spaced longitudinally from the free end of the jacket 60 by a predetermined distance which, in the preferred embodiment, is approximately one eighth (⅛) of an inch. The seal bushing 65 is of a material having a relatively low coefficient of heat conductivity, and is of stainless steel in the preferred embodiment.

This arrangement maintains the thermosetting material at the free end of the core 59 within the seal bushing 65 at at least the curing temperature of the thermosetting material, so that a short sprue of cured material is formed in the tip of the core 59. In the preferred embodiment, the bushing 65 is approximately one fourth (¼) of an inch in longitudinal extent, and the cured sprue is also of this length.

This arrangement of the core 59 and jacket 60 and bushing 65 produces a zone of high temperature gradient 66 of approximately one eighth (⅛) of an inch in longitudinal extent. The thermosetting material in the nozzle passage 61 above the zone of high temperature gradient 66 is maintained at a temperature below the curing temperature, while the thermosetting material in the nozzle passage 61 below the zone of high temperature gradient 66 is maintained at at least the curing temperature of the material. This provides a predictable and predetermined length sprue in the passage 61 which is pulled from the passage 61 when the mold heating platen 13 is separated longitudinally from the mold halves 14 and 15 at the end of each molding cycle.

Figure 2:
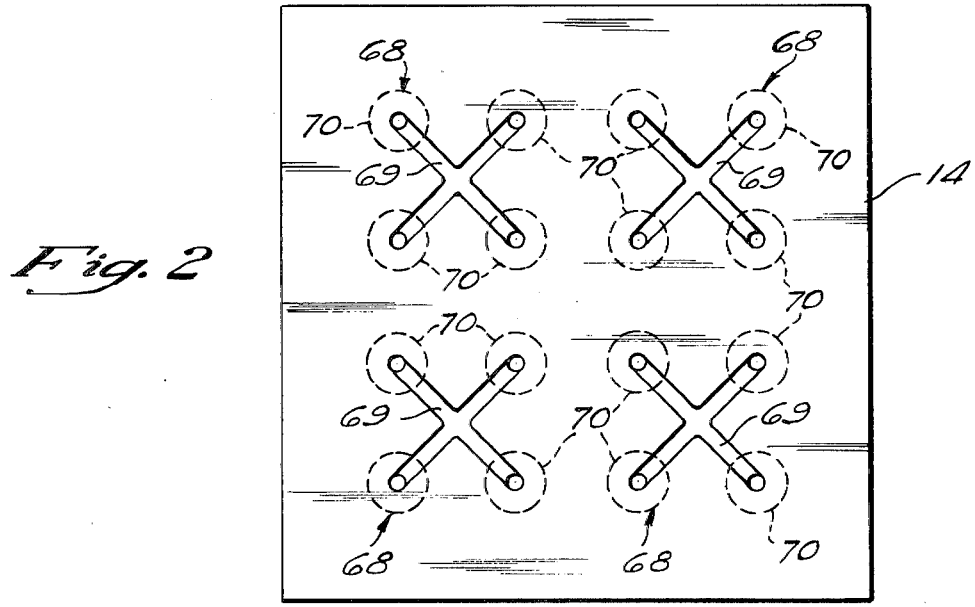
FIG. 2 is a top plan view of the mold shown in FIG. 1 taken along reference view line 2—2 in FIG. 1 and reduced in size.

Referring to FIGS. 1 and 2, the uppr mold half 14 includes an array of four mold clusters 68, one associated with each of the distribution nozzles 58. Each mold cluster includes a cross-shaped runner 69 and four female mold cavities 70. The lower mold half 15 includes an array of four clusters of male mold portions, with each cluster containing four male mold portions 71. When the mold halves 14 and 15 are closed together, the female mold portions 70 and male portions 71 cooperate to form cup-shaped mold cavities. In this manner, the four distribution nozzles 59 each supply thermosetting material to a cluster of four mold cavities, so that a total of sixteen cup-shaped articles are molded with each cycle of the machine.

At the beginning of a cycle, the mold heating platen 13 and the mold halves 14 and 15 are pressed together in a longitudinal direction. The mold heating platen 13 and the lower mold heating platen (not shown in the drawings) on the lower side of the mold half 15 heat the mold halves 14 and 15 to a temperature sufficient to cure the thermosetting material in the predetermined cycle time when the material is injected into the runners and cupshaped cavities. During this portion of the cycle, the thermosetting material is in the cold injector chamber 33, the cold supply chamber 39, the cold portions of the distribution chambers 43 and 44 between the supply chamber 39 and the distribution nozzles 58, and the cold portions of the nozzle passages 61 which are above the zones 66 of high temperature gradient. During this portion of the cycle, the core 59 and jacket 60 and bushing 65, in cooperation with the fluid passages 50 and 51 and the chamber 32, maintain this thermosetting material at a temperature which is high enough to provide the desired flow characteristics of the material but which is lower than the curing temperature of the material.

The injector piston (not shown in the drawings) which is slidably disposed in the injector chamber 33 is then moved downwardly a predetermined distance to displace a predetermined volume of the thermosetting material from the injector chamber 33 through the supply nozzle 34 to the supply chamber 39. This forces the thermosetting material through each distribution passage 43 and 44 and through the passage 61 of each distribution nozzle 58 into the runner cavity 69 and the four cup-shaped mold cavities associated with each of the four distribution nozzles 58. At the end of a predetermined curing time, the thermosetting material in the sixteen cup-shaped cavities and in the four runners and in the portion of the nozzle passage 61 which is disposed below the zone 66 of hich temperature gradient is cured.

The mold halves 14 and 15 are then separated from one another and from the mold heating platen 13. This pulls the short sprue in the tip of the nozzle passage 61 described above from the end of the nozzle passage 61 with the cured material in the runners 69. Suitable ejector means then push the cured material upwardly from the runners 69 and push the molded cupshaped articles from the sixteen open mold cavities. This cycle is then repeated for the production of another sixteen cupshaped articles.

The waste material which results from the use of this machine is the cured material in the runners 69 and the cured material in the free end of the nozzle passage 61. The entire remaining portions of the thermosetting material in the distribution passages 43 and 44 and in the remaining portions of the distribution nozzles 58 is not cured and is therefore not wasted. This provides a substantial reduction in the volume of wasted thermosetting material from known commercial prior art machines, in which a single cold distribution nozzle distributes the thermosetting material through long hot runners in the mold to the mold cavities. The volume of wasted material in the hot mold runners of these prior art machines is substantially larger than the volume of wasted material in the runners of the machine according to this invention, since the long runners of the prior art machines had to be of greater cross-sectional area to accommodate a greater flow rate therethrough.

The arrangement of the distribution nozzles 58 also contributes to this decrease in waste material by providing a practical usable nozzle which does not require a complicated liquid cooling system for each nozzle but which instead conveys the heat from the nozzle core to the distribution platen so that the heat is dissipated in the liquid media flowing through the passages 50 and 51 in the distribution platen 12.

When it is desired to change the mold halves 14 and 15, the mold halves are removed from the machine without removing the distribution platen or heating platen or distribution nozzles. The mold halves 14 and 15 are then replaced with another set of mold halves (not shown) which also have a mold cluster with a plurality of mold cavities and a runner for each of the four distribution nozzles 58. The mold clusters in the replacement halves may be different from the mold cluster 68 (for example, the replacement mold clusters may each contain three mold cavities each having a ball shaped configuration) so long as the mold clusters are each adjacent a distribution nozzle. Because the several distribution nozzles which extend through the heating platen and which have the zone of high temperature gradient from hot to cold are completely separate and apart from the mold halves, the mold halves do not have to contain distribution nozzles or temperature transition zones. This simplifies the mold design and renders the molds for multiple nozzle multiple cavity thermosetting injection molding machines less costly.

When it is desired to service or change the distribution platen 12 and mold heating platen 13, the entire subassembly of the platens 12 and 13 is released from the bolster platen 11 by releasing the two threaded fasteners 25. The subassembly is then replaced with another similar subassembly (not shown) which, for example, may have three distribution chambers and six distribution nozzles for use with other molds (not shown) having a mold cluster with a plurality of mold cavities and a runner for each of the six distribution nozzles. Additionally, the replacement subassembly may be other than of square lateral configuration and may have distribution nozzles wich are arranged at various distances from the supply chamber.

The distribution platen 12 may be separated from the mold heating platen 13 by the four threaded fasteners 23, permitting removal of the distribution nozzles 58 from the distribution platen 12 and from the mold heating platen 13. When the distribution nozzles 58 are removed from the distribution platen 12 in this manner, the distribution chambers 43 and 44 are simply straight through cross bores in the platen 12 which may be easily cleaned.

What is claimed is:

1. In combination, a multiple nozzle thermosetting injection molding machine and a mold; said thermosetting injection molding machine comprising an injector chamber, a distribution platen, a heating platen, and a plurality of distribution nozzles; said injector chamber and distribution platen and heating platen and mold being disposed along a longitudinal axis, said distribution platen being disposed between said injector chamber and said heating platen, and said heating platen being disposed between said distribution platen and said mold; said injector chamber being adapted to be filled with a thermosetting material having a predetermined curing temperature, said injector chamber having a piston for pressurizing thermosetting material in said injector chamber; said mold having a plurality of mold clusters, said mold clusters being spaced from one another, each of said mold clusters including a plurality of separate mold cavities and a runner extending between said mold cavities; said distribution platen being a generally flat plate having a first side facing said injector chamber and a second side facing said heating platen, a supply chamber extending from said first side of said distribution platen into said distribution platen, said supply chamber being adjacent said injector chamber and being constructed and arranged to receive thermosetting material from said injector chamber; said distribution platen further including a distribution chamber extending along a line through said distribution platen and intersecting said supply chamber to receive thermosetting material from said supply chamber, a nozzle bore on each side of said supply chamber, said nozzle bores each extending from said second side of said distribution platen through said distribution chamber, one of said distribution nozzles being in each of said nozzle bores for receiving thermosetting material from said distribution chamber, said distribution nozzles each extending from said distribution chamber toward said mold for carrying said thermosetting material from said distribution chamber to said mold; each of said distribution nozzles having a nozzle chamber constructed and arranged to carry thermosetting material from said distribution chamber to a single one of said mold clusters of said mold; said heating platen being a generally flat plate having heating means providing a source of heat; said nozzle chambers each extending through said heating platen from said distribution platen toward said mold; first temperature control means for maintaining the temperature of said distribution chamber below said predetermined curing temperature; second temperature control means for maintaining the temperature of at least a major portion of each of said nozzle chambers within said heating platen below said predetermined curing temperature; third temperature control means including said heating means for maintaining the temperature of said mold cavities at a temperature of at least said predetermined curing temperature.

2. The combination set forth in claim 1, said thermosetting injection molding machine including a stationary end plate, said distribution platen and mold heating platen being secured together to form a distribution and heating subassembly, and said subassembly being removably secured to said stationary end plate.

3. The combination set forth in claim 1, each of said distribution nozzles extending into its associated nozzle bore completely through said distribution chamber, each of said distribution nozzles being dimensioned and arranged to completely block said distribution chamber, and each of said distribution nozzles being removably disposed in its associated nozzle bore.

4. In combination, a multiple nozzle thermosetting injection molding machine and a mold; said thermosetting injection molding machine comprising an injector chamber, a distribution platen, a heating platen, and a plurality of distribution nozzles; said injector chamber and distribution platen and heating platen and mold being disposed along a longitudinal axis, said distribution platen being disposed between said injector chamber and said heating platen, and said heating platen, and said heating platen being disposed between said distribution platen and said mold; said injector chamber being adapted to be filled with a thermosetting material having a predetermined curing temperature, said injector chamber having a piston for pressurizing thermosetting material in said injector chamber; said mold having a plurality of mold clusters, said mold clusters being spaced from one another, each of said mold clusters including a plurality of separate mold cavities and a runner extending between said mold cavities; said distribution platen being a generally flat plate having a first side facing said injector chamber and a second side facing said mold and two pairs of opposite peripheral edge portions facing outwardly away from said longitudinal axis, a supply chamber extending from said first side of said distribution platen into said distribution platen, said supply chamber being adjacent said injector chamber and being constructed and arranged to receive thermosetting material from said injector chamber; said distribution platen further including a first distribution chamber extending between one of said two pairs of opposite edge portions, a second distribution chamber extending between the other of said two pairs of opposite edge portions, each of said distribution chambers intersecting said supply chamber to receive thermosetting material from said supply chamber, four nozzle bores extending from said second side of said distribution platen with two of said nozzle bores intersecting each of said first and second distribution chambers, said nozzle bores each being disposed between said supply chamber and one of said edge portions, all of said nozzle bores being equidistant from said supply chamber, one of said distribution nozzles being in each of said nozzle bores for receiving thermosetting material from its associated one of said first and second distribution chambers, said distribution nozzles each having a nozzle chamber extending from said distribution chamber toward said mold for carrying thermosetting material from said distribution chamber to a single one of said mold clusters; said heating platen having a generally flat plate having heating means providing a source of heat; said nozzle chambers each extending through said heating platen from said distribution platen toward said mold; first temperature control means maintaining the temperature of said first and second distribution chambers below said predetermined curing temperature; second temperature control means maintaining the temperature of a major portion of each of said nozzle chambers below said predetermined curing temperature; third temperature control means including said heating platen maintaining the temperature of said mold cavities at a temperature of at least said curing temperature under normal operating conditions.

5. The combination set forth in claim 4, said first temperature control means including four V-shaped liquid media flow passages in said distribution platen, the vertex of each of said V-shaped passages being adjacent said supply chamber, the legs of said V-shaped flow passages each extending along one of said distribution chambers.

6. The combination set forth in claim 5, said first and second distribution chambers each having a centerline disposed in a first plane, said four V-shaped passages each having centerlines disposed in a second plane, and said second plane being disposed between said first plane and said mold.

7. The combination set forth in claim 5, said four V-shaped passages being connected in series to provide a continuous flow path around said first and second distribution passages.

8. In combination, a multiple nozzle thermosetting injection molding machine and a mold; said thermosetting injection molding machine comprising an injector chamber, a distribution platen, at least two distribution nozzles, and a heating platen; said injector chamber and distribution platen and mold being disposed along a longitudinal axis with said distribution platen being disposed between said injector chamber and said mold; said injector chamber being adapted to be filled with a thermosetting material having a predetermined curing temperature; said distribution platen being a generally flat plate having a first side facing said injector chamber and a second side facing said mold, a supply chamber extending from said first side of said distribution platen in a direction parallel to said longitudinal axis into said distribution platen, said longitudinal supply chamber being adjacent said injector chamber and being constructed and arranged to receive thermosetting material from said injector chamber; said distribution platen further including a distribution chamber extending in a direction away from said longitudinal axis through said distribution platen and intersecting said supply chamber to receive thermosetting material from said supply chamber, a nozzle bore in said distribution platen on each side of said supply chamber, said nozzle bores each extending in a direction parallel to said longitudinal axis from said second side of said distribution platen through said distribution chamber, one of said distribution nozzles being in each of said nozzle bores for receiving thermosetting material from said distribution chamber, said distribution nozzles each having a nozzle chamber extending in a direction parallel to said longitudinal axis from said distribution chamber toward said mold for carrying thermosetting material from said distribution chamber to said mold; first temperature control means maintaining the temperature of said distribution chamber below said predetermined curing temperature; second temperature control means maintaining the temperature of at least a major portion of each of said nozzle chambers below said predetermined curing temperature; third temperature control means maintaining the temperature of said mold at a temperature of at least said predetermined curing temperature; said heating platen being a generally flat plate disposed along said longitudinal axis between said mold and said distribution platen, said heating platen including heating means providing a source of heat, said third temperature control means including said heating platen, said distribution nozzles extending through said heating platen toward said mold; said distribution platen further including a liquid media flow passage extending through said distribution platen substantially coextensively with said distribution chamber for maintaining said distribution chamber at a temperature below said predetermined curing temperature, said first temperature control means including said liquid media flow passage; each of said distribution nozzles including a generally cylindrical core and a generally cylindrical jacket, said core including said nozzle chamber, said core having a first portion disposed within said distribution platen and a second portion disposed within said heating platen, said jacket being concentrically disposed on the outer peripheral surface of said core, said jacket engaging said outer peripheral surface of said second portion of said core, said jacket including a head portion extending into said distribution platen nozzle bore, said heat portion having a predetermined area engaging said distribution platen, said predetermined area being sufficient to transfer enough heat from said jacket through said distribution platen to said liquid media flow passage to maintain the temperature of at least a major portion of said nozzle chamber in said heating platen nozzle bore below said curing temperature, said second temperature control means including said jacket.

9. The combination set forth in claim 8, said liquid media flow passage and said distribution chamber each being disposed in a plane disposed slowly in a direction perpendicular to said longitudinal axis, said liquid media flow passage plane being disposed between said distribution chamber plane and said heating platen.

10. The combination set forth in claim 8, said jacket having a sufficiently greater coefficient of thermal conductivity than said core as to maintain said major portion of said nozzle chamber below said predetermined curing temperature, said head portion of said jacket being disposed between said liquid media flow passage and said heating platen.

11. In combination, a multiple nozzle thermosetting injection molding machine and a mold; said thermosetting injection molding machine having a longitudinal axis and comprising an injector chamber, a distribution platen, a heating platen, and at least two distribution nozzles; said injector chamber being adapted to be filled with a thermosetting material having a predetermined curing temperature; each of said distribution nozzles having a nozzle chamber extending in a direction parallel to said longitudinal axis from said distribution platen through said heating platen toward said mold to carry thermosetting material from said injector chamber to said mold; first temperature control means maintaining the temperature of said injector chamber below said predetermined curing temperature; second temperature control means maintaining the temperature of at least a portion of each of said nozzle chambers below said predetermined curing temperature; third temperature control means maintaining the temperature of said mold at a temperature of at least said predetermined curing temperature; said heating platen being a generally flat plate disposed along said longitudinal axis between said mold and said distribution platen, said heating platen including heating means providing a source of heat, said third temperature control means including said heating means; each of said distribution nozzles including a generally cylindrical core and a generally cylindrical jacket, said core including said nozzle chamber, said core having a portion disposed within said heating platen, said jacket being concentrically disposed on the outer peripheral surface of said portion of said core, said jacket engaging said outer peripheral surface of said portion of said core, said jacket having a predetermined area engaging said distribution platen to transfer heat from said jacket to said distribution platen to maintain the temperature of at least a portion of said nozzle chamber below said curing temperature, said second temperature control means including said jacket.

12. The combination set forth in claim 11, said jacket having a shorter extent in said heating platen than said core portion whereby said core portion has a first region coextensive with and covered by said jacket, and a second region extending beyond said jacket and uncovered by said jacket, said second region being adjacent said mold.

13. The combination set forth in claim 12, said second region including a temperature gradient zone, said nozzle chamber extending through said temperature gradient zone, and the portion of said nozzle chamber extending through said temperature gradient zone adjacent said mold being at a temperature of at least said curing temperature.

14. The combination set forth in claim 13, said thermosetting injection molding machine including an annular bushing disposed in said heating platen adjacent said mold, said bushing being spaced from said jacket and engaging said core in said second region, said second region surrounded by said bushing being at a temperature of at least said curing temperature, said temperature gradient zone being between said bushing and said jacket.

15. In combination, a multiple nozzle thermosetting injection molding machine and a mold; said thermosetting injection molding machine having a longitudinal axis and comprising an injector chamber, a distribution platen, a heating platen, and at least two distribution nozzles; said injector chamber being adapted to be filled with a thermosetting material having a predetermined curing temperature; each of said distribution nozzles having a nozzle chamber extending in a direction parallel to said longitudinal axis from said distribution platen through said heating platen toward said mold to carry thermosetting material from said injector chamber to said mold; first temperature control means maintaining the temperature of said injector chamber below said predetermined curing temperature; second temperature control means maintaining the temperature of at least a portion of each of said nozzle chambers below said predetermined curing temperature; third temperature control means maintaining the temperature of said mold at a temperature of at least said predetermined curing temperature; said heating platen being a generally flat plate disposed along said longitudinal axis between said mold and said distribution platen, said heating platen including heating means providing a source of heat, said third temperature control means including said heating means; each of said distribution nozzles including a generally cylindrical core and a generally cylindrical jacket, said core including said nozzle chamber, said core having a portion disposed within said heating platen, said jacket being concentrically disposed on the outer peripheral surface of said portion of said core, said jacket engaging said outer peripheral surface of said portion of said core, said jacket having a predetermined area engaging said distribution platen to transfer heat from said jacket to said distribution platen to maintain the temperature of at least a portion of said nozzle chamber below said curing temperature, said second temperature control means including said jacket, said core and said jacket each having a predetermined coefficient of thermal conductivity, said coefficient of said jacket being substantially greater than said coefficient of said core.

16. The combination set forth in claim 15, said core coefficient of thermal conductivity being less than 20 b.t.u./hr./sq.ft./F.°/ft. and said jacket coefficient of thermal conductivity being greater than 200 b.t.u./hr./sq.ft./F.°/ft.

17. In combination, a multiple nozzle thermosetting injection molding machine and a mold; said thermosetting injection molding machine comprising an injector chamber, a distribution platen, a heating platen and at least two distribution nozzles; said injector chamber and distribution platen and heating platen and mold being disposed along a longitudinal axis, said distribution platen being disposed between said injector chamber and said heating platen, and said heating platen being disposed between said distribution platen and said mold; said injector chamber being adapted to be filled with a thermosetting material having a predetermined curing temperature; said distribution platen being a generally flat plate having a first side facing said injector chamber and a second side facing said heating platen, a supply chamber extending from said first side of said distribution platen into said distribution platen, said supply chamber being adjacent said injector chamber and being constructed and arranged to receive thermosetting material from said injector chamber; each of said distribution nozzles being constructed and arranged to carry thermosetting from said supply chamber to said mold; said heating platen being a generally flat plate having heating means providing a source of heat; said distribution nozzles each extending through said heating platen from said distribution platen toward said mold; first temperature control means maintaining the temperature of said distribution platen below said predetermined curing temperature; second temperature control means maintaining the temperature of a portion of each of said distribution nozzles below said predetermined curing temperature; third temperature control means including said heating means maintaining the temperature of said mold at a temperature of at least said predetermined curing temperature; each of said distribution nozzles including a generally cylindrical core and a generally cylindrical jacket, said core including a nozzle chamber extending from said distribution platen toward said mold to carry said thermosetting material from said distribution platen to said mold, said core having a first portion disposed within said distribution platen and a second portion disposed within said heating platen, said jacket being concentrically disposed on the outer peripheral surface of said second portion of said core, said jacket engaging said outer peripheral surface of said second portion of said core, said jacket having a predetermined area engaging said distribution platen to transfer heat from said jacket to said distribution platen to maintain the temperature of at least a portion of said nozzle chamber below said curing temperature, said second temperature control means including said jacket.

18. In combination, a multiple nozzle thermosetting injection molding machine and a mold; said thermosetting injection molding machine comprising an injector chamber, a distribution platen, a heating platen, and at least two distribution nozzles; said injector chamber and distribution platen and mold being disposed along a longitudinal axis with said distribution platen being disposed between said injector chamber and said mold; said injector chamber being adapted to be filled with a thermosetting material having a predetermined curing temperature; said distribution platen being a generally flat plate having a first side facing said injector chamber and a second side facing said mold, a supply chamber extending from said first side of said distribution platen in a direction parallel to said longitudinal axis into said distribution platen, said supply chamber being adjacent said injector chamber and being constructed and arranged to receive thermosetting material from said injector chamber; at least two nozzle bores extending from said second side of said distribution platen into said distribution platen, one of said distribution nozzles being in each of said nozzle bores, each of said distribution nozzles extending from said distribution platen toward said mold to carry said thermosetting material from said supply chamber to said mold; first temperature control means maintaining the temperature of a portion of said distribution platen below said predetermined curing temperature; second temperature control means maintaining the temperature of at least a portion of each of said distribution nozzles below said predetermined curing temperature; third temperature control means maintaining the temperature of said mold at a temperature of at least said predetermined curing temperature under normal operating conditions; said heating platen being a generally flat plate disposed along said longitudinal axis between said mold and said distribution platen, said heating platen including heating means providing a source of heat, said third temperature control means including said heating platen, at least two nozzle bores extending through said heating platen in alignment with said distribution platen nozzle bores, said distribution nozzles extending through said heating platen toward said mold; each of said distribution nozzles including a generally cylindrical core and a generally cylindrical jacket, said core including a nozzle chamber extending from said distribution platen toward said mold to carry thermosetting material from said distribution platen to said mold, said core having a first portion disposed within said distribution platen nozzle bore and a second portion disposed within said heating platen nozzle bore, said jacket being concentrically disposed on the outer peripheral surface of said second portion of said core, said jacket engaging said outer peripheral surface of said second portion of said core, said jacket having a predetermined area engaging said distribution platen to transfer heat from said jacket to said distribution platen to maintain the temperature of at least a portion of said nozzle chamber below said curing temperature, said jacket having a substantially greater coefficient of thermal conductivity than said core.

19. The combination set forth in claim 18, said heating platen nozzle bore having a bore wall, said jacket being spaced radially inwardly from said heating platen nozzle bore wall along its entire longitudinal extent whereby a gap is provided between said heating platen nozzle bore wall and said jacket.

20. The combination set forth in claim 19, the entire exterior surface of said jacket facing said nozzle bore wall being coated with a reflective coating to reflect heat from said heating platen.

21. The combination set forth in claim 18, said jacket having a shorter extent in said heating platen than said core second portion whereby said core second portion has a first region coextensive with and covered by said jacket, and a second region extending beyond said jacket and uncovered by said jacket, said second region being adjacent said mold, said second region of said core in said heating platen nozzle bore including a temperature gradient zone; an annular bushing disposed in said heating platen nozzle bore adjacent said mold, said bushing being spaced from said jacket and engaging said core in said second region, said temperature gradient zone being between said bushing and said jacket.

22. The combination set forth in claim 18, said jacket including an enlarged diameter head portion extending into said distribution platen nozzle bore, said head portion having a predetermined area engagin said distribution platen, said predetermined area being sufficient to transfer enough heat from said jacket to said distribution platen to maintain the temperature of at least a major portion of said nozzle chamber in said heating platen nozzle bore below said curing temperature.

23. The combination set forth in claim 18, said thermosetting injection molding machine including a, stationary end plate, said distribution platen and mold heating platen being secured together to form a distribution and heating subassembly, and said subassembly being removably secured to said stationary end plate.

* * * * *